(12) United States Patent
Ratigan et al.

(10) Patent No.: US 11,219,800 B1
(45) Date of Patent: Jan. 11, 2022

(54) ROPE EDGE PROTECTION SYSTEM

(71) Applicants: Michael Ratigan, Elon, NC (US);
Edward Ratigan, Graham, NC (US)

(72) Inventors: Michael Ratigan, Elon, NC (US);
Edward Ratigan, Graham, NC (US)

(*) Notice: Subject to any disclaimer, the term of this patent is extended or adjusted under 35 U.S.C. 154(b) by 0 days.

(21) Appl. No.: 17/076,334

(22) Filed: Oct. 21, 2020

(51) Int. Cl.
*F16L 57/06* (2006.01)
*A63B 29/02* (2006.01)

(52) U.S. Cl.
CPC .............. *A63B 29/02* (2013.01); *F16L 57/06* (2013.01)

(58) Field of Classification Search
CPC ........ F16L 57/06; B63B 21/04; B63B 29/028; B63B 29/02; B63B 29/08; B63B 2209/10; B66C 1/122
USPC .... 138/118.1, 110, 151, 156, 128; 428/35.1, 428/36.9, 36.1; 254/389; 248/205.2, 248/68.1
See application file for complete search history.

(56) References Cited

U.S. PATENT DOCUMENTS

| | | | | |
|---|---|---|---|---|
| 4,402,489 A | * | 9/1983 | Murray | B65H 57/12 182/230 |
| 5,535,787 A | * | 7/1996 | Howell | H02G 3/0487 138/110 |
| 5,901,756 A | * | 5/1999 | Goodrich | F16L 3/233 138/167 |
| 7,325,575 B1 | * | 2/2008 | O'Donnell | B63B 21/04 138/110 |
| 8,752,590 B2 | * | 6/2014 | Petty | A63B 29/02 138/110 |
| 10,213,649 B2 | | 2/2019 | Norton | |
| 2002/0170727 A1 | * | 11/2002 | Holland | H02G 15/18 174/19 |
| 2011/0272654 A1 | * | 11/2011 | Fay | B65H 57/04 254/389 |
| 2012/0037527 A1 | * | 2/2012 | Fay | A62B 1/14 206/372 |
| 2015/0267347 A1 | * | 9/2015 | Farmer | B66C 1/122 87/7 |
| 2016/0279477 A1 | * | 9/2016 | Petty | A63B 29/02 |
| 2016/0325969 A1 | * | 11/2016 | Randle | B66C 1/122 |

OTHER PUBLICATIONS

Webpage printout showing Ultra-Pro TM Edge Protectors as sold by CMC Pro, print date Jul. 30, 2020.

(Continued)

*Primary Examiner* — Patrick F Brinson
(74) *Attorney, Agent, or Firm* — Tuggle Duggins P.A.; Blake P. Hurt

(57) ABSTRACT

A rope edge protection system having a rope protection mat and an edge protection mat in combination for the protection of rope. The rope protection mat is a generally rectangular sheet that can be secured in a sleeve-like configuration around a climbing rope and move along the rope with the user. The edge protection mat is a generally rectangular sheet with loops on each corner, but not limited to the corners, to secure the sheet in place against a building or other structure. The edge protection mat is a multi-layer sheet with a high loft layer to decrease the bend radius of the rope across a ledge. Both the rope protection mat and the edge protection mat include visual safety indicators.

17 Claims, 4 Drawing Sheets

(56) References Cited

OTHER PUBLICATIONS

Webpage printout from Amazon showing P68 Set Caterpillar Articulated Protector sold by Petzl America, print date Jul. 30, 2020.
Webpage printout from safewaze.com showing SafeWaze Rope Protector, print date Jul. 30, 2020.
Webpage printout from ropesafeusa.com showing Ropesafe Edge Protection System, copyright RopeSafe Edge Protection System 2020.
Webpage printout from rescuetech1.com showing RescueTECH Rope Guard, copyright 2003, 2004, 2005, 2006, 2007, 2008, 2009, 2010 Rescue Technology / Technical Rope Rescue Equipment.

* cited by examiner

ROPE EDGE PROTECTION SYSTEM

The invention relates to a device for the protection of ropes and specifically to a device for protecting climbing ropes from abrasion.

FIELD OF THE INVENTION

The invention herein pertains to industrial vehicle accessories generally, and particularly pertains to a cure-in-place exhaust insulation sleeve for use in connection with industrial vehicles

DESCRIPTION OF THE PRIOR ART AND OBJECTIVES OF THE INVENTION

Professionals, such as firefighters, rescue workers, police, roofers, window washers and others, rely on ropes to safely perform their duties. Military personnel and civilians also use ropes for scaling cliffs and ledges, or to ascend or descend from cliffs, ledges, rooftops, interior of caves, boilers, and ship hulls, etc. In these and other uses, the ropes are required to pass over rocks, railings, window ledges, edges of buildings and other locations where the fibers of the rope can become abraded, which compromises the load-bearing capabilities of the rope and the safety of the user.

To protect the ropes from such abrasion, it is known in the art to place something between the rope and the adjacent structure. The Ultra-Pro™ Edge Protector sold by CMC Pro is semi-rigid molded plastic sheet that has a plurality of channels formed along the longitudinal axis of the sheet. The channels allow the ropes to be maintained in spaced-apart relation when the device is in use. The sheet is flexible at least along the longitudinal axis and can conform to the edge of a building. The device is said to reduce friction on the ropes and to soften the bend radius of the rope. Similar devices are sold by Seattle Manufacturing Corporation under the brand names "FLEX" and "Rope Tracker." Another type of device, known as an articulated edge protector, comprises a series of roller modules. Each module has a roller supported by a frame that acts as a standoff to elevate the roller from an adjacent surface. The roller modules may be linked together to form a flexible articulated chain which is then placed over an edge of a structure. The rope is then placed atop the roller(s). An example of such a device is the P68 Set Caterpillar Articulated Protector sold by Petzl America. Yet another type of rope protection device is a flexible mat made from abrasion-resistant materials that can be placed between the rope and an adjacent structure. The mat can be used flat or wrapped around the rope and secured to form a protective sleeve. Numerous such devices are commercially available, such as the SafeWaze Rope Protector, RopeSafe and RescueTECH Rope Guard. One such mat, as taught in U.S. Pat. No. 10,213,649 (the entire disclosure of which is incorporated herein by reference) can also be attached to the rope and be repositioned along the rope by the user. The mat includes a handle used to carry the mat and facilitate repositioning the mat during use and can also be used as a load bearing member.

Regardless of these, and other, attempts to protect the professional and personal ropes of the world, the current solutions are ineffective. Thus, in view of the problems and disadvantages associated with prior art devices, the present invention was conceived and one of its objectives is to provide a rope protection system that has increased versatility.

It is another objective of the present invention to provide a rope protection system that has functionality to protect ropes from abrasion.

It is still another objective of the present invention to provide a rope protection system that can soften the radius of bend of a rope.

It is yet another objective of the present invention to provide a rope protection system that is useful as a load bearing support.

It is a further objective of the present invention to provide a rope protection system that incorporates visual safety indicators.

Various other objectives and advantages of the present invention will become apparent to those skilled in the art as a more detailed description is set forth below.

SUMMARY OF THE INVENTION

In an embodiment, the present invention provides an edge protection system to minimize chafe or abrasion on ropes. The edge protection system comprises two flexible mats or sheets, used in combination. The first sheet is a rope protection sheet having an inner surface and an outer surface, two opposed lateral edges and two opposed longitudinal edges. A hanging loop is affixed to each lateral edge and a pair of spaced-apart loops are affixed to the inner surface. The rope protection sheet can be wrapped in a sleeve-like configuration about a rope and secured in place with a pair of spaced-apart straps, each located proximate a respective lateral edge of the mat and/or a mating fastener member on longitudinal edges of the sleeve. The second sheet is an edge protection mat having an inner surface and an outer surface with multiple intermediate layers, two opposed lateral edges and two opposed longitudinal edges. A loop is affixed to each corner of the edge protection mat and a pair of spaced-apart loops are affixed to at least one of the inner surface or outer surface. The second sheet has a high loft layer to soften the bend radius of the rope. Both the edge protection sheet and the rope protection sheet incorporate visual safety indicators.

DETAILED DESCRIPTION OF THE PREFERRED EMBODIMENT AND OPERATION OF THE INVENTION

Figure 1:
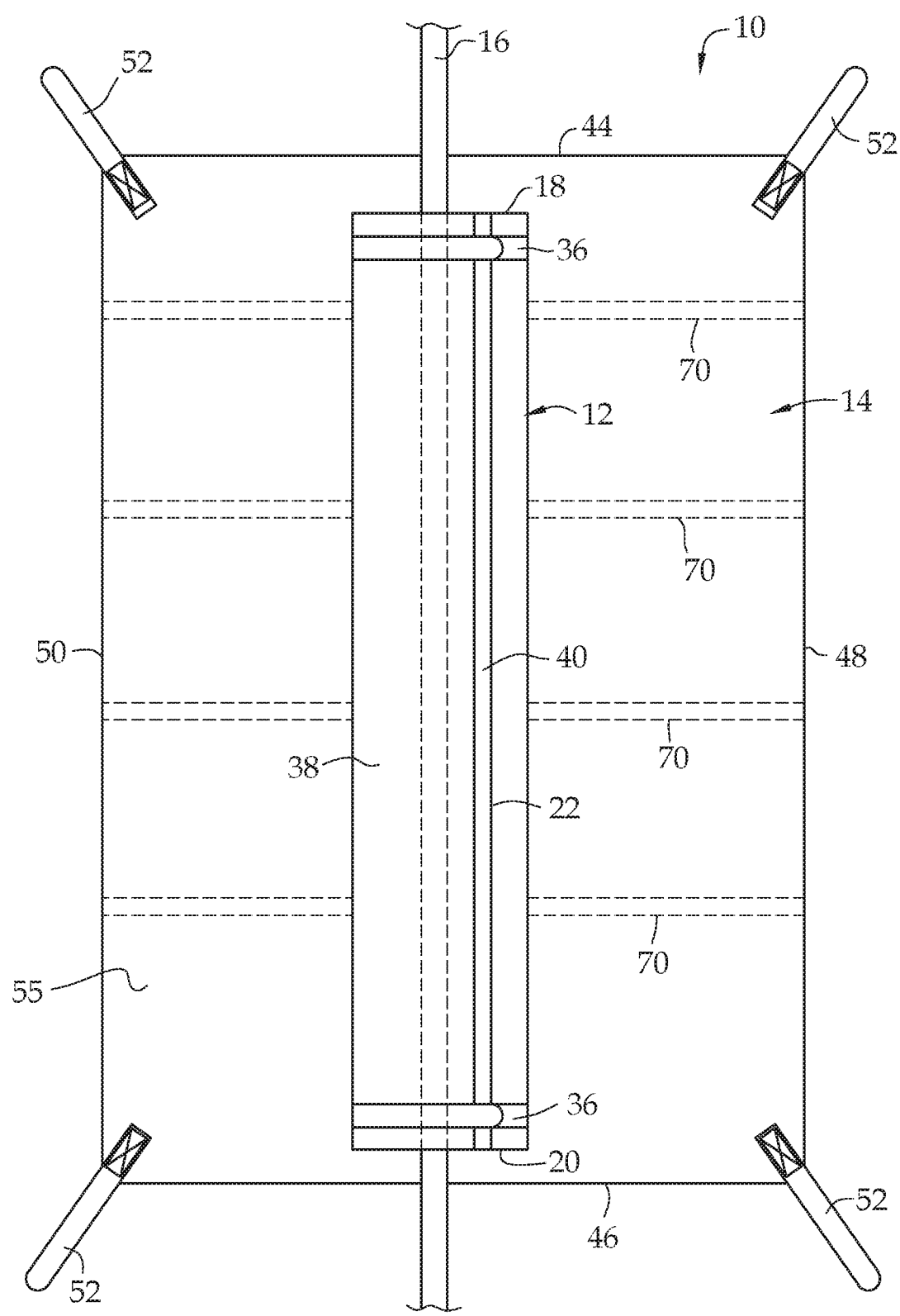
FIG. 1 is a plan view of a preferred embodiment of the rope edge protection system, illustrating the rope protection mat closed around a rope and placed atop the edge protection mat.

Various exemplary embodiments of the present disclosure are described below. Use of the term "exemplary" means illustrative or buy way of example only, and any reference herein to "the invention" is not intended to restrict or limit the invention to exact features or step of any one or more of the exemplary embodiments disclosed in the present specification. References to "exemplary embodiment", "one embodiment", "an embodiment", "various embodiments", and the like may indicate that the embodiment(s) of the invention so described may include a particular feature, structure, or characteristic, but not every embodiment necessarily incudes the particular feature, structure, or characteristic. Further, repeated use of the phrase "in one embodiment", "in an exemplary embodiment", or "in an alternative embodiment" do not necessarily refer to the same embodiment, although they may.

It is also noted that terms like "preferably", "commonly", and "typically" are not utilized herein to limit the scope of the invention or to imply that certain features are critical, essential, or even important to the structure or function of the invention. Rather, these terms are merely intended to highlight alternative or additional features that may or may not be utilized in a particular embodiment of the present invention.

The present invention is described more fully hereinafter with reference to the accompanying figures, in which one or more exemplary embodiments of the invention are shown. Like numbers used herein refer to like elements throughout. The invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limited as to the scope of the invention, and any and all equivalents thereof. Moreover, many embodiments such as adaptations, variations, modifications, and equivalent arrangements will be implicitly disclosed by the embodiments described herein and fall within the scope of the instant invention.

Although specific terms are employed herein, they are used in a generic and descriptive sense only and not for the purposes of limitation. Unless otherwise expressly defined herein, such terms are intended to be given their broad, ordinary, and customary meaning not inconsistent with that applicable in the relevant industry ad without restriction to any specific embodiment hereinafter described. As used herein, the article "a" is intended to include one or more items. Where only one item is intended, the terms "one and only one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has previously been reduced to practice or that any testing has been performed. Likewise, unless stated otherwise, use of verbs in the past tense (present perfect or preterit) is not intended to indicate or imply that the invention has previously been reduced to practice or that any testing has been performed.

The rope edge protection system of the invention is a device ideally suited for protecting a climbing rope that, in part, is configured to surround a climbing rope. In a preferred embodiment, the rope edge protection system has two flexible portions or mats that are used in combination to provide superior protection to ropes and other equipment used by climbers, window washers, firefighters, rescue crews, etc.

With reference to FIG. 1, the preferred embodiment of the rope edge protection system 10 includes a rope protection mat 12 and an edge protection mat 14. While the rope protection system of the invention is quite versatile, in the most common contemplated use the rope protection mat 12 would be wrapped around the climbing rope 16 and then placed on top of the edge protection mat 14, which would be placed adjacent to the building or other structure (not shown). Once the user is in position, the rope protection mat 12 could be moved along the rope 16 as the user descends or ascends the rope, if desired.

Figure 2:
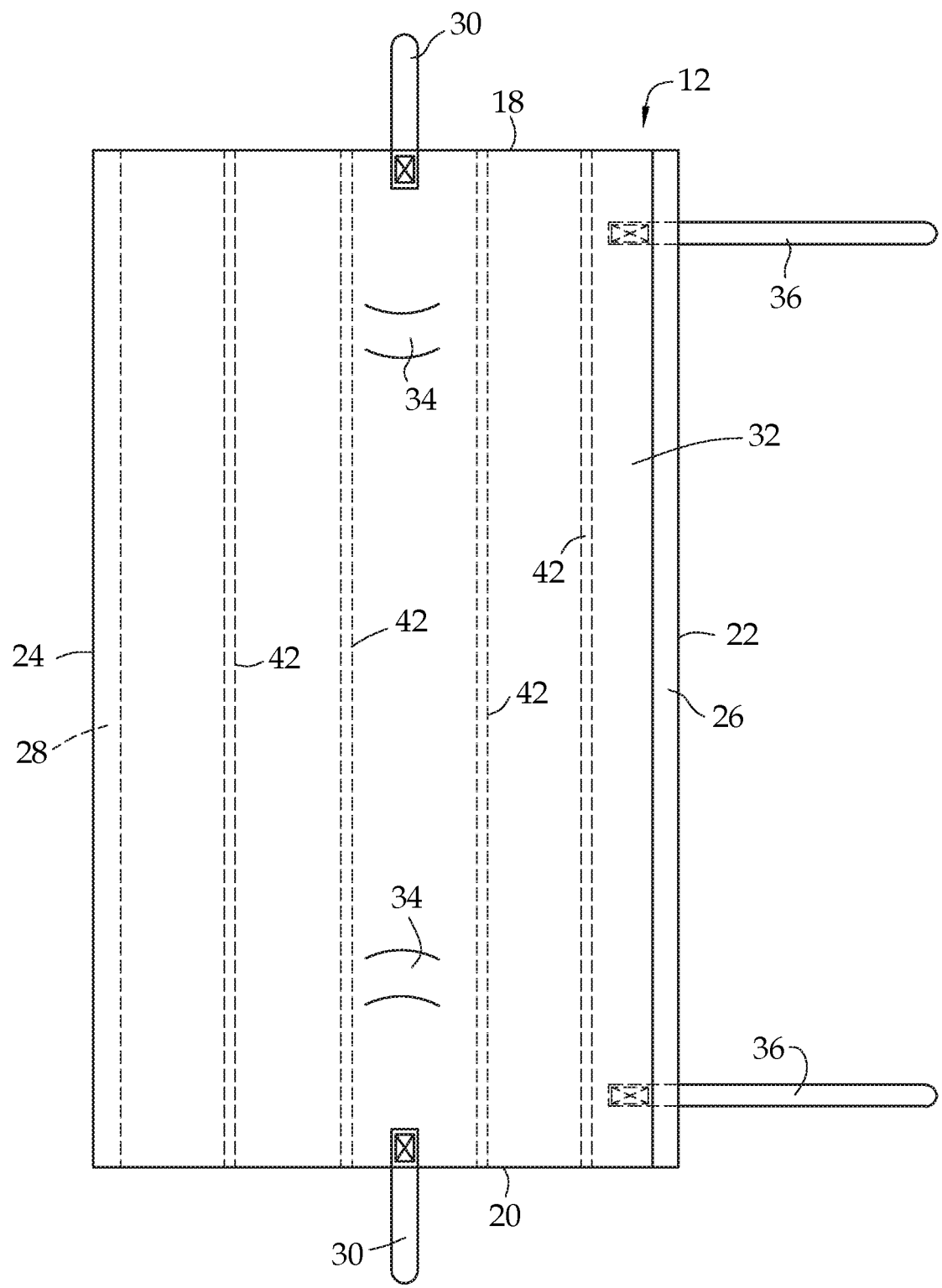
FIG. 2 is a plan view of the rope protection mat of the rope edge protection system, shown in open configuration and illustrating the inner surface of the mat.

As can be seen in FIG. 2, an embodiment of the rope protection mat 12 in its open position, illustrating the inner surface of the mat, preferably defines a generally rectangular configuration having opposed lateral edges 18, 20 and opposed longitudinal edges 22, 24. Longitudinal edges 22 and 24 comprise a fastener including a first fastener component 26 and a second fastener component 28 (shown in phantom) enabling at least a portion of the length of the longitudinal edges 22 and 24 to be removeably attached to each other. The fastener components 26, 28 are preferably individual halves of a fastening tape that when used together allow closure for ease of use, although other closing mechanisms can be utilized as are known in the art for attaching and detaching at least a portion of the opposing longitudinal edges 22 and 24 of the flexible mat 12. Non-limiting examples of closure devices are buttons, snaps, zippers, hook and eye fasteners or magnetic fasteners. Rope protection mat or sleeve 12 should define a sufficient modulus of flexion to provide an opening large enough for a load-bearing rope to pass through the opening created when the fastener halves 26, 28 are disengaged and the edges 22, 24 are not attached to each other.

With continued reference to FIG. 2, a hanging loop 30, each approximately 1-2 inches (2.54-5.08 cm) in length, is affixed to each of the lateral edges 18, 20 of the rope protection mat 12. These hanging loops 30, 30 can be used to secure the rope protection mat 12 to the climbing rope 16 (FIG. 1) or to an anchor device. It is also seen in FIG. 2 that the inner surface 32 of rope protection mat 12 includes one or more, and preferably a pair of spaced-apart loops 34, 34. These loops 34, 34 allow the user to insert for example, a 1 inch (2.54 cm) anchor sling 35 (FIG. 3) under the loops, thus allowing the user to anchor the loop at the top side end and use the bottom end as a handle to assist the user getting into position before they descend down the building. The system can also be used as an anchor point and the climber hooking up the top loops on the sling. Edge protection mat 14 likewise includes one or more, and preferably a pair of spaced-apart loops 56, 56, for the insertion of anchor sling 35 as described herein.

A pair of spaced-apart closure straps 36, 36 are located proximate to and oriented parallel to the lateral edges 18, 20 of rope protection mat 12. When the rope protection mat 12 is in the closed position, as seen in FIG. 1, the closure straps 36, 36 wrap around the mat and maintain the mat 12 in a closed position as desirable. The closure straps 36, 36 may be used in addition to or in lieu of first and second fastener components 26, 28.

The outer face 38 (see FIG. 1) of the rope protection mat 12 is preferably made of a woven polymeric material, more preferably a woven nylon material, and most preferably a woven nylon material in a herringbone weave pattern, with the inner face 32 preferably formed from 1000 denier (D) ballistic nylon. The material used to make the outer face 38 is preferably a dark color, such as black, and the material used to make the inner face is preferably a high-visibility color such as yellow, orange or lime green. The term "high-visibility color" (or "hi-vis" for short) in this context is taken to include all high-visibility apparel embodiments as defined by ANSI/ISEA 107-2015, including Type O, Type R, and Type P embodiment types of Class 1, 2, 3, E, and Optional High-Visibility Accessory performance classes. The high color contrast between the layers 38, 32 is preferred as a visual safety indicator alerting the user that the outer layer has worn through, exposing the high-visibility layer.

A preferred embodiment of outer face 38 is provided with reflective material 40 along the peripheral edges (18, 20, 22, 24) as an additional visual safety indicator. As a further additional visual safety feature, the materials used for the inner face and outer face are preferably sewn together using reflective thread 42 (FIG. 2). An example of an acceptable reflective thread is the reflective thread offered commercially by Ki-Shin Corp. which is a 2000 denier, three filament thread with a tenacity of 3800 cN. Tapes, appliques, and powered illumination sources may also be incorporated as desirable.

Figure 3:
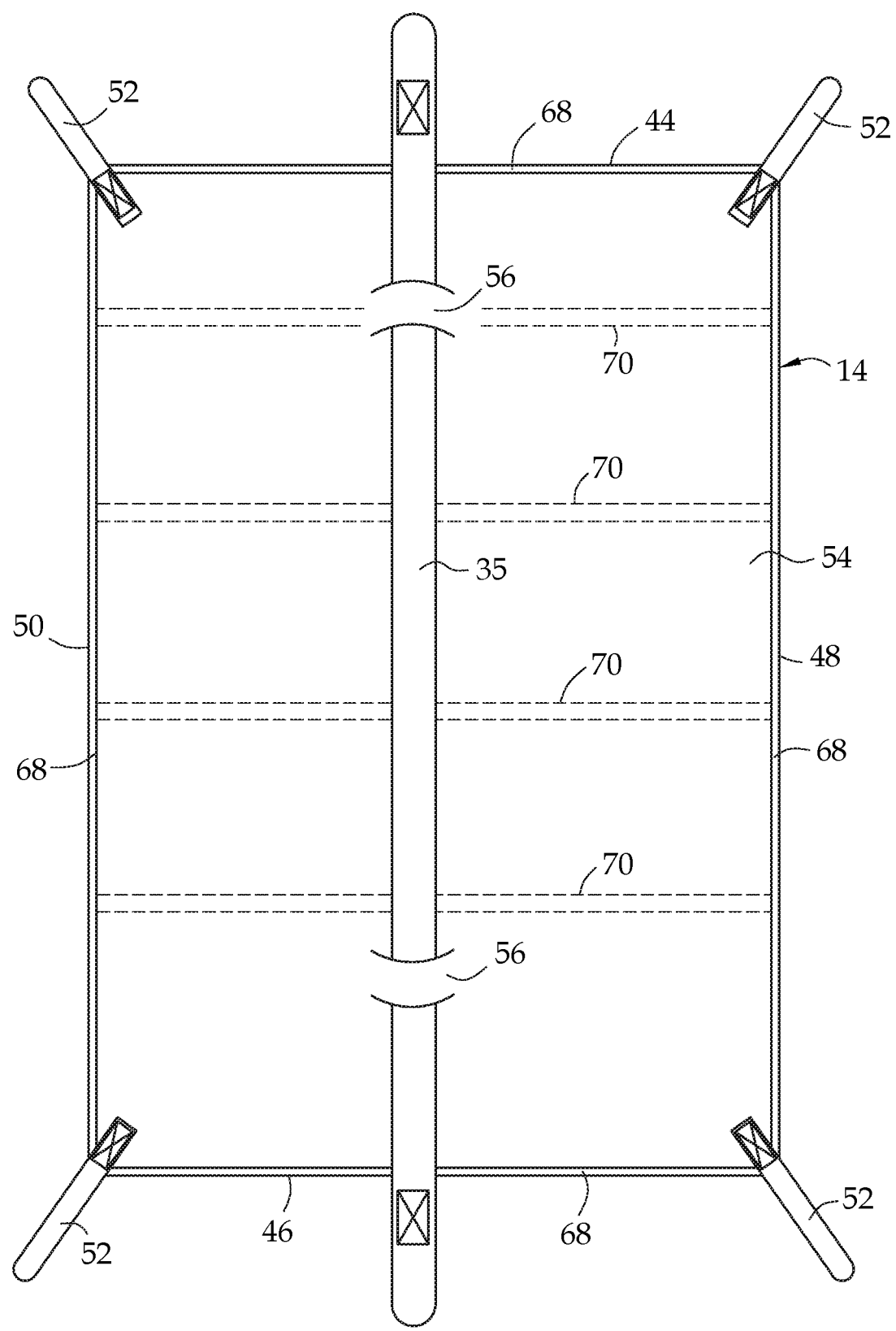
FIG. 3 is a plan view of the edge protection mat of the rope edge protection system and illustrating the outer surface of the mat.
Figure 4:
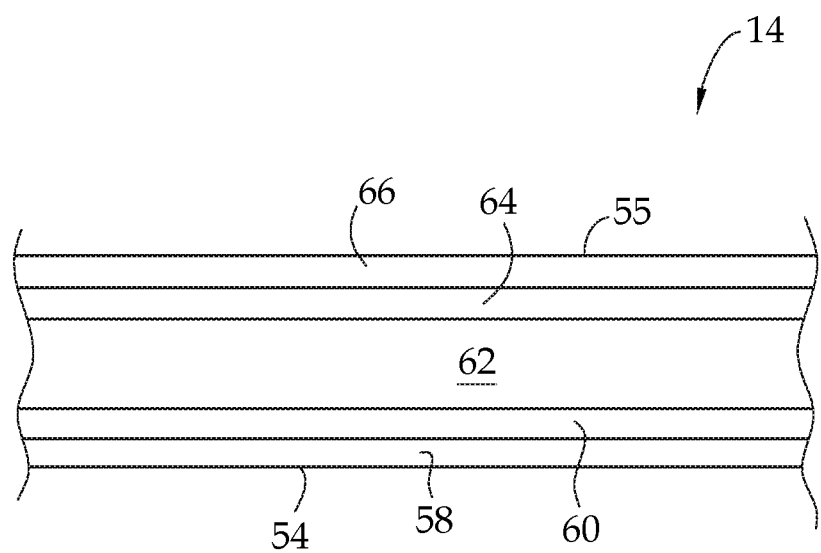
FIG. 4 is a schematic, fragmentary cross section view of the edge protection mat, illustrating the multi-layer construction.

With reference now being made to FIGS. 1, 3, and 4, the edge protection mat 14 preferably defines a generally rectangular configuration having opposed lateral edges 44, 46 and opposed longitudinal edges 48, 50. Each corner of the edge protection mat 14 may include a 1-2 inch (2.54-5.08 cm) long loop 52, preferably made of nylon, to anchor the edge protection mat in position. Unlike the rope protection mat 12, the edge protection mat 14 is intended to remain stationary during use in most applications.

The edge protection mat or sheet 14 is used to soften the bend radius of the rope as it goes over the edge of a building or used underneath metal climbing gear to prevent them from being damaged by the building or rocks, etc. With particular reference to FIG. 4, edge protection mat 14 has a multi-layer construction including an outward or bottom surface 54 and inward or upper surface 55. In preferred embodiments, the outermost layer 58 is preferably formed from the aforementioned nylon weave in a herringbone pattern, intermediate layer 60 is made of 1000D ballistic nylon, intermediate layer 62 is made from a high loft, three-dimensional textile such as the HiFlow™ Spacer Fabrics from Highland Industries, intermediate layer 64 is made from 1000D ballistic nylon and inner most layer 66 is made from the aforementioned nylon weave, also in a herringbone pattern. In alternate embodiments where even more robust protection is desired, the outermost layer 58 is made from 0.25 inch thick nylon webbing and intermediate layer 60 is made from 1680D ballistic nylon.

As visual safety indicators, as seen in FIG. 3, reflective trim 68 may be used around the perimeter edges (44, 46, 48, 50) of the edge protection mat 14 and the layers may be sewn together using a silver reflective thread 70. In addition, it is preferred that intermediate layers 60 and 64 be of contrasting color compared to outer layers 58 and 66 as further visual safety indicators. The reason is that as the external layers 58, 66 begin to wear, the high contrast color will begin to telegraph through and alert the user that the protection afforded by the mat has been compromised, for instance in circumstances where edge protection mat 14 experiences a high degree of friction or abrasion during a single use, or over many uses. Additionally, or in the alternative, edge protection mat 14 may qualify as fire/flame resistant under ANSI/ISEA 107-2015.

The illustrations and examples provided herein are for explanatory purposes and are not intended to limit the scope of the appended claims, and while specific terms have been employed, they are used in a generic and descriptive sense only. Modifications and alternatives that may suggest themselves to those skilled in the art upon reading the foregoing disclosure are intended to be considered within the scope of the invention.

We claim:

1. A rope edge protection system comprising, in combination: a rope protection mat and an edge protection mat, the rope protection mat defined as a flat, generally rectangular sheet having an inside surface made of a first material, an outside surface made of a second material, a pair of opposed longitudinal edges and a pair of opposed lateral edges, said rope protection mat including fasteners to maintain the mat in a rolled, sleeve-like configuration around a climbing rope, wherein one or both of the rope protection mat and the edge protection mat comprise visual safety indicators, the visual safety indicator on said rope protection mat further comprising a hi-vis color material as the first material and a high contrast color material as the second material.

2. The rope edge protection system of claim 1, the rope wherein the visual safety indicator on said rope protection mat further comprise reflective strips at the longitudinal and lateral edges on the outside surface of the rope protection mat.

3. The rope protection system of claim 1, wherein said rope protection fasteners are defined as straps located proximate the opposed lateral edges to maintain the mat in a rolled, sleeve-like configuration around a climbing rope; and wherein the visual safety indicator on said rope protection mat further comprise reflective strips at the longitudinal and lateral edges on the outside surface of the rope protection mat and on said straps.

4. The rope edge protection system of claim 1, wherein rope protection mat fasteners are further defined as mating fasteners on the opposed longitudinal edges to maintain the mat in a rolled, sleeve-like configuration around a climbing rope.

5. The rope edge protection system of claim 4, wherein said mating fasteners selected from hook and loop fasteners, zipper, buttons and snaps.

6. The rope edge protection system of claim 1, wherein the visual safety indicator on said rope protection mat comprises reflective stitching securing the first material to the second material.

7. The rope edge protection system of claim 1, wherein said first material comprises a 1000D ballistic nylon in a hi-vis color; said second material comprises a black nylon weave in a herringbone pattern; and wherein the visual safety indicator on said edge protection mat further comprises reflective strips at the longitudinal and lateral edges on the outside surface of the rope protection mat and on said fasteners in combination with reflective stitching securing the first material to the second material.

8. The rope edge protection system of claim 1, further comprising a hanging loop located at each of the opposed lateral; a pair of spaced-apart loops located on the inside surface; wherein said first material comprises a 1000D ballistic nylon in a hi-vis color; wherein said second material comprises a woven black nylon in a herringbone pattern; and wherein the visual safety indicator on said edge protection mat further comprises reflective strips at the longitudinal and lateral edges on the outside surface of the rope protection mat and on said fasteners in combination with reflective stitching securing the first material to the second material.

9. The rope edge protection system of claim 1, wherein the edge protection mat comprises a flat, generally rectangular sheet having a pair of opposed longitudinal edges and a pair of opposed lateral edges, said edge protection mat comprising a multiple-layer material with an inside surface layer, an outside surface layer, and multiple intermediate layers between the inside surface layer and the outside surface layer.

10. The rope edge protection system of claim 1, wherein the edge protection mat comprises a flat, generally rectangular sheet having a pair of opposed longitudinal edges and a pair of opposed lateral edges, said edge protection mat comprising a multiple-layer material with an inside surface layer, a first intermediate layer adjacent the inside surface layer, a middle layer adjacent the first intermediate layer, a second intermediate layer adjacent the middle layer, and an outside surface layer; and wherein the visual safety indicator on said edge protection mat comprises reflective strips at the longitudinal and lateral edges on the outside surface layer of the edge protection mat.

11. The rope edge protection system of claim 1, wherein the edge protection mat comprises a flat, generally rectangular sheet having a pair of opposed longitudinal edges and a pair of opposed lateral edges, said edge protection mat comprising a multiple-layer material with an inside surface layer, a first intermediate layer adjacent the inside surface layer, a middle layer adjacent the first intermediate layer, a second intermediate layer adjacent the middle layer, and an outside surface layer; and wherein the visual safety indicator on said edge protection mat comprises a hi-vis color material as the second intermediate layer and a high contrast color material as the outside surface layer.

12. The rope edge protection system of claim 1, wherein the edge protection mat comprises a flat, generally rectangular sheet having a pair of opposed longitudinal edges and a pair of opposed lateral edges, said edge protection mat comprising a multiple-layer material with an inside surface layer, a first intermediate layer adjacent the inside surface layer, a middle layer adjacent the first intermediate layer, a second intermediate layer adjacent the middle layer, and an outside surface layer; and wherein the visual safety indicator on said edge protection mat comprises a hi-vis color material as the second intermediate layer and a high contrast color material as the outside surface layer; wherein the visual safety indicator on said edge protection mat further comprises reflective strips at the longitudinal and lateral edges on the outside surface layer of the edge protection mat.

13. The rope edge protection system of claim 1, wherein the edge protection mat comprises a flat, generally rectangular sheet having a pair of opposed longitudinal edges and a pair of opposed lateral edges, said edge protection mat comprising a multiple-layer material with an inside surface layer, a first intermediate layer adjacent the inside surface layer, a middle layer adjacent the first intermediate layer, a second intermediate layer adjacent the middle layer, and an outside surface layer; and wherein the visual safety indicator on said edge protection mat comprises a hi-vis color material as the second intermediate layer and a high contrast color material as the outside surface layer; wherein the visual safety indicator on said edge protection mat further comprises reflective strips at the longitudinal and lateral edges on the outside surface layer of the edge protection mat and reflective stitching to secure the multiple layers together.

14. The rope edge protection system of claim 1, wherein the edge protection mat comprises a flat, generally rectangular sheet having a pair of opposed longitudinal edges and a pair of opposed lateral edges, said edge protection mat comprising a multiple-layer material with an inside surface layer, a first intermediate layer adjacent the inside surface layer, a middle layer adjacent the first intermediate layer, a second intermediate layer adjacent the middle layer, and an outside surface layer adjacent the second intermediate layer; wherein the visual safety indicator on said edge protection mat comprises a hi-vis color material as the second intermediate layer and a high contrast color material as the outside surface layer; wherein the visual safety indicator on said edge protection mat further comprises reflective strips at the longitudinal and lateral edges on the outside surface layer of the edge protection mat and reflective stitching to secure the multiple layers together; wherein the middle layer comprises a high loft, three-dimensional textile.

15. The rope edge protection system of claim 1, wherein the edge protection mat comprises a flat, generally rectangular sheet having a pair of opposed longitudinal edges and a pair of opposed lateral edges, said edge protection mat comprising a multiple-layer material with an inside surface layer, a first intermediate layer adjacent the inside surface layer, a middle layer adjacent the first intermediate layer, a second intermediate layer adjacent the middle layer, and an outside surface layer adjacent the second intermediate layer; wherein the visual safety indicator on said edge protection mat comprises a hi-vis color material as the second intermediate layer and a high contrast color material as the outside surface layer; wherein the visual safety indicator on said edge protection mat further comprises reflective strips at the longitudinal and lateral edges on the outside surface layer of the edge protection mat and reflective stitching to secure the multiple layers together; wherein the inside surface layer is an herringbone nylon weave material; wherein the first intermediate layer is a 1000D nylon material; wherein the middle layer is a high loft, three-dimensional textile; wherein the second intermediate layer is selected from a 1000D nylon material and a 1680D nylon material; and wherein the outside surface layer is selected from an herringbone nylon weave material and 0.25 inch thick nylon webbing.

16. The rope edge protection system of claim 1, wherein the edge protection mat comprises a flat, generally rectangular sheet having a pair of opposed longitudinal edges and a pair of opposed lateral edges, said edge protection mat comprising a multiple-layer material with an inside surface layer, a first intermediate layer adjacent the inside surface layer, a middle layer adjacent the first intermediate layer, a second intermediate layer adjacent the middle layer, and an outside surface layer adjacent the second intermediate layer; wherein the visual safety indicator on said edge protection mat comprises a hi-vis color material as the second intermediate layer and a high contrast color material as the outside surface layer; wherein the visual safety indicator on said edge protection mat further comprises reflective strips at the longitudinal and lateral edges on the outside surface layer of the edge protection mat and reflective stitching to secure the multiple layers together; wherein the inside surface layer is an herringbone nylon weave material; wherein the first intermediate layer is a 1000D nylon material; wherein the middle layer is a high loft, three-dimensional textile; wherein the second intermediate layer is selected from a 1000D nylon material and a 1680D nylon material; and wherein the outside surface layer is selected from an herringbone nylon weave material and 0.25 inch thick nylon webbing; wherein said edge protection mat further comprises a loop secured on each corner of said rectangular sheet and a pair of spaced-apart loops on at least one of the inside surface layer or outside surface layer.

17. The rope edge protection system of claim 1, wherein the rope protection mat further comprises a handle located at each of the opposed lateral edges; a pair of spaced-apart loops located on the inside surface; wherein said first material comprises a 1000D ballistic nylon in a hi-vis color; wherein said second material comprises a woven black nylon in a herringbone pattern; and wherein the visual safety indicator on said rope protection mat further comprise reflective strips at the longitudinal and lateral edges on the outside surface of the rope protection mat and on said fasteners in combination with reflective stitching securing the first material to the second material; wherein the rope edge protection system of claim 1, wherein the edge protection mat comprises a flat, generally rectangular sheet having a pair of opposed longitudinal edges and a pair of opposed lateral edges, said edge protection mat comprising a multiple-layer material with an inside surface layer, a first intermediate layer adjacent the inside surface layer, a middle layer adjacent the first intermediate layer, a second intermediate layer adjacent the middle layer, and an outside surface layer adjacent the second intermediate layer; wherein the visual safety indicator on said edge protection mat comprises a hi-vis color material as the second intermediate layer and a high contrast color material as the outside surface layer; wherein the visual safety indicator on said edge protection mat further comprises reflective strips at the longitudinal and lateral edges on the outside surface layer of the edge protection mat and reflective stitching to secure the multiple layers together; wherein the inside surface layer is an herringbone nylon weave material; wherein the first intermediate layer is a 1000D nylon material; wherein the middle layer is a high loft, three-dimensional textile; wherein the second intermediate layer is selected from a 1000D nylon material and a 1680D nylon material; and wherein the outside surface layer is selected from a herringbone nylon weave material and 025 inch thick nylon webbing; wherein said edge protection mat further comprises a loop secured on each corner of said rectangular sheet and a pair of spaced-apart loops on at least one of the inside surface layer or outside surface layer.

\* \* \* \* \*

UNITED STATES PATENT AND TRADEMARK OFFICE
CERTIFICATE OF CORRECTION

| | |
|---|---|
| PATENT NO. | : 11,219,800 B1 |
| APPLICATION NO. | : 17/076334 |
| DATED | : January 11, 2022 |
| INVENTOR(S) | : Michael Ratigan and Edward Ratigan |

It is certified that error appears in the above-identified patent and that said Letters Patent is hereby corrected as shown below:

In the Specification

The first paragraph is deleted; and
The paragraph immediately following the heading "FIELD OF THE INVENTION" is corrected to read as:
The invention herein pertains to a device for the protection of ropes and specifically to a device for protecting climbing ropes from abrasion.

Signed and Sealed this
Fourteenth Day of June, 2022

Katherine Kelly Vidal
*Director of the United States Patent and Trademark Office*